United States Patent [19]

Althouse, III

[11] 4,448,210

[45] May 15, 1984

[54] APPARATUS AND METHOD FOR CONTROLLING THE LEVEL OF A LIQUID IN A TANK

[75] Inventor: James W. Althouse, III, Tulsa, Okla.

[73] Assignee: The Dow Chemical Company, Midland, Mich.

[21] Appl. No.: 496,763

[22] Filed: May 20, 1983

[51] Int. Cl.[3] .......................... F16K 21/18; F17D 3/00

[52] U.S. Cl. .......................................... 137/2; 137/406; 137/408; 137/572; 137/579; 222/1; 222/56

[58] Field of Search ......................... 137/1, 2, 386, 389, 137/403, 408, 395, 396, 391, 572, 577, 579, 406; 222/1, 56, 64

[56] References Cited

U.S. PATENT DOCUMENTS

| | | | |
|---|---|---|---|
| 625,339 | 5/1899 | Krueger | 137/403 |
| 954,175 | 4/1910 | Engebretson | 137/391 |
| 1,211,753 | 1/1917 | Rakestraw | 137/396 |
| 1,425,340 | 8/1922 | Sabin | 137/396 |
| 1,798,208 | 3/1931 | Kratzer | 137/408 |
| 1,852,975 | 4/1932 | Kratzer | 137/408 |
| 2,307,324 | 1/1943 | Larson | 137/403 |
| 2,708,435 | 5/1955 | Lewis | 137/408 |
| 3,285,276 | 11/1966 | Schipper | 137/408 |
| 3,677,279 | 7/1972 | Lenfant | 137/408 |

FOREIGN PATENT DOCUMENTS

| | | | |
|---|---|---|---|
| 41083 | 11/1929 | Denmark | 137/406 |

*Primary Examiner*—George L. Walton
*Attorney, Agent, or Firm*—V. Dean Clausen

[57] ABSTRACT

The invention disclosed herein is a "fail safe" apparatus for controlling the level of a liquid in a tank. The apparatus includes a holding tank for temporarily containing the liquid. There is an access opening along the top surface of the tank so that the tank is open to the atmosphere at all times. An outlet conduit, with a swivel joint therein, connects the bottom of the tank to an ultimate use point for the liquid. One end of a delivery conduit extends into the holding tank and the opposite end connects into a source for the liquid. A fill valve in the delivery conduit is linked to the holding tank by a mechanical valve operator and an air spring is fastened to the tank. When liquid is drawn out of the tank, the air spring expands and swivels the tank to a position which opens the fill valve. Filling the tank with liquid causes the air spring to compress and swivels the tank in the opposite direction to a position which closes the fill valve.

2 Claims, 1 Drawing Figure

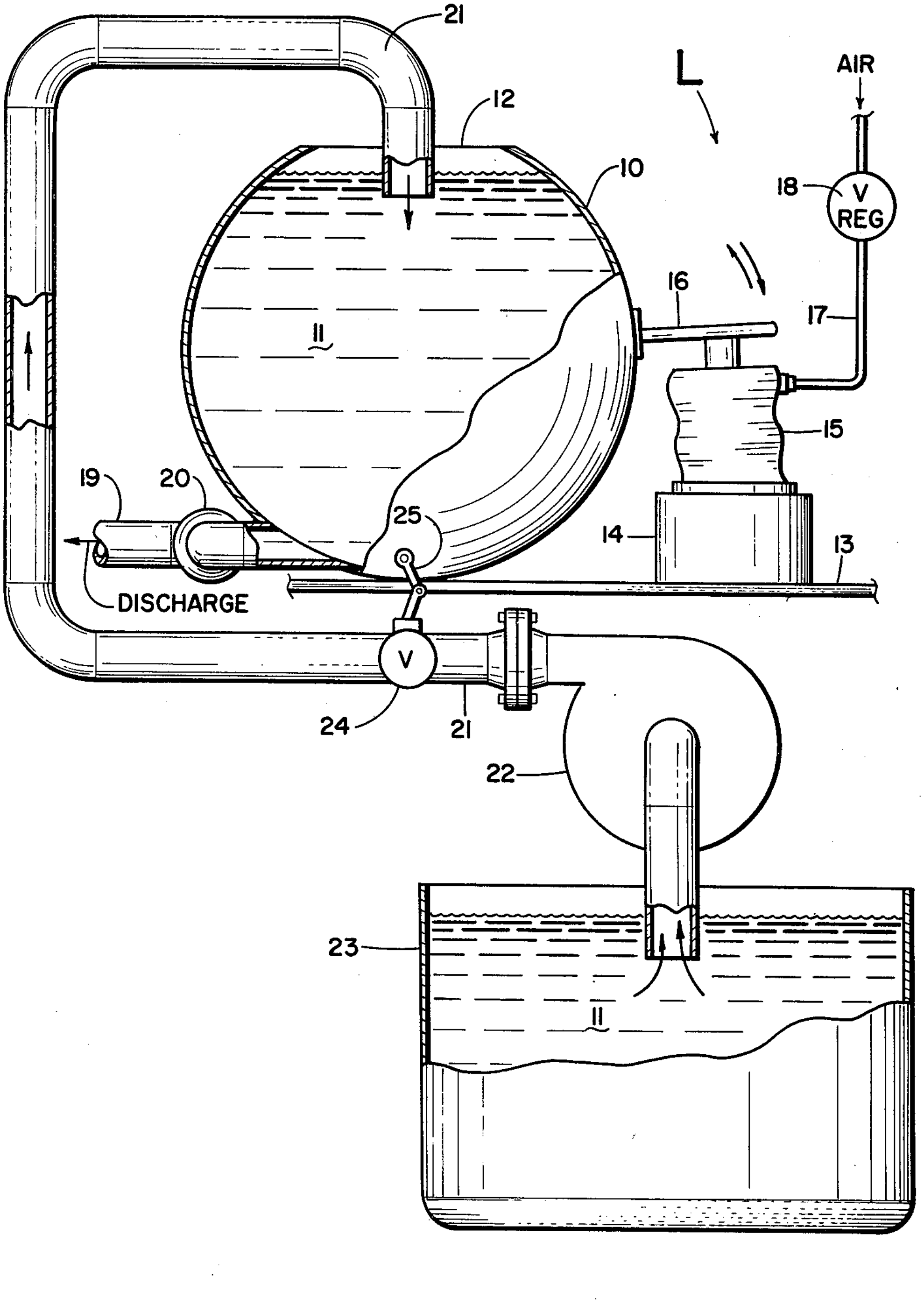
21
12
L
AIR
10
18
V
REG
16
17
11
15
19
20
25
14
13
DISCHARGE
V
24
21
22
23
11

APPARATUS AND METHOD FOR CONTROLLING THE LEVEL OF A LIQUID IN A TANK

BACKGROUND OF THE INVENTION

The invention relates to an apparatus and method for controlling the level of a liquid in a tank.

There are various types of devices in use for controlling the level of a liquid in a holding tank. These devices often include a float of some type which rides on the surface of the liquid. The float usually activates a pressure transducer or some other device designed to open and close an inlet valve in response to the level of liquid in the tank.

The liquid level sensors described above have several drawbacks. First of all, these devices must come in contact with the liquid to perform their sensing function. This can cause the sensors to stick or become plugged off as a result of corrosion or solid particles in the liquid. The resulting malfunction of the floats or pressure sensors may allow the inlet valve to remain open and cause an undesirable overfill condition. Floats and pressure sensors are also unreliable devices for determining the level of liquid in a tank when the liquid is under agitation.

For the reasons described above, most of the liquid level sensing systems in use today have the potential for initiating a hazardous situation, such as fire or explosion. The present invention completely eliminates the need for any kind of sensors which must come in contact with the stored liquid, so that it provides a "fail safe" system for controlling the level of the liquid in a tank or other vessel.

SUMMARY OF THE INVENTION

The invention provides a means for controlling the level of a liquid in a tank. The basic apparatus comprises a tank suitable for containing the liquid. The tank has an access opening along its top surface and includes an outlet conduit which connects the bottom of the tank to a use point. The apparatus further includes a delivery conduit having one end which extends into the tank through the access opening and an opposite end which connects into a source for the liquid. An air spring is fastened to the tank and is mounted on a support structure adjacent to the tank.

A pressure regulator means is connected into the air spring to control flow of air into the spring. A fill valve is installed in the delivery conduit between the liquid source and the access opening and a valve operator means links the tank to the valve. The tank also includes an outlet conduit which has a swivel joint therein. In the operation of this apparatus, when liquid is withdrawn from the tank, the air spring expands and swivels the tank upwardly until it reaches a position in which the valve operator opens the valve. When liquid is added to the tank through the delivery conduit, it causes the air spring to compress and lower the tank until it reaches a second position in which the valve operator closes the valve.

DESCRIPTION OF THE DRAWING

The single FIGURE of the drawing is a profile view, partly in section, and partly schematic, of one embodiment of the liquid level control apparatus of this invention.

DESCRIPTION OF THE INVENTION

Referring to the drawing, the level control device of this invention is generally indicated by the letter L. The main component of this device is a holding tank 10 which is suitable for containing a liquid 11. Along the top surface of the tank is an opening 12, so that the tank is open to the atmosphere. In its usual environment, the tank 10 will set on a flat surface 13, such as a deck or floor. Adjacent to the tank 10 a base piece 14 is secured to the deck 13. An air spring 15 is mounted on the base piece and is also fastened by an arm member 16 to the tank.

The air spring is connected by line 17 to a conventional pressure regulator 18, which meters a given amount of air into the spring. At the bottom of tank 10 is an outlet conduit 19, which has a swivel joint 20 therein. Preferably, the conduit 19 is connected into tank 10 at one end of the tank, and it makes a right angle bend and runs parallel to the tank for at least the length of the tank. Placing the swivel joint 20 close to the tank and running the outlet conduit 19 parallel to the tank enables the tank to properly swivel in its normal function as a liquid level control, as described later in this specification. The opposite end of conduit 19 (not shown) is connected into any desired point of use or disposal point for the liquid 11 in the tank.

The liquid 11 is pumped into the holding tank 10 through a delivery conduit 21. The delivery end of conduit 21 extends into the tank through the access opening 12. At the opposite end, conduit 21 connects into a suitable source of the liquid. In the embodiment illustrated herein, conduit 21 connects into a cengtrifugal pump 22, which withdraws the liquid 11 from a supply tank 23. Means for regulating the flow of liquid into the holding tank 10 is provided by a fill valve 24, which is installed in conduit 21 immediately below the holding tank.

Fill valve 24 is opened and closed by a valve operator means which links the valve to the holding tank 10. It is preferred to use valves which are opened or closed by an up and down movement of the valve stem and valve closure, such as gate valves or globe valves. The preferred valve operator means is a mechanical arm 25, which moves the valve stem and closure up and down in response to the up and down movement of the holding tank 10. Valve 24 is illustrated only schematically, so that the stem and the gate or globe closures are not shown in the drawing.

Operation

The invention can be illustrated by describing the use of the present liquid level control apparatus in an operation which involves treating an oil or gas well to enhance recovery of the petroleum product. A typical stimulation liquid consists of water mixed with dry materials, such as high molecular weight polymers. The first step is to fill the supply tank 23 with enough treating liquid 11 to complete the job. Pump 22 is then started and the treating liquid is pumped through the delivery conduit 21 until the holding tank 10 is full. When the holding tank is full of liquid, as illustrated in the drawing, valve 24 is in its fully closed position.

With valve 24 in the fully closed position, the air pressure inside the air spring 15, as regulated by the pressure regulator 18, exerts a force which is slightly less than that required to overcome the combined weight of the holding tank and the liquid it contains.

The air pressure reading at this point, which is held constant by the pressure regulator 18, is referred to as the "maximum load pressure". As the treating fluid 11 is drawn out of tank 10, the weight of the liquid remaining in the tank begins to drop immediately. When this happens the force of the compressed air in the air spring 15 soon overcomes the opposing force created by the weight of the liquid 11 in tank 10, and the swivel joint 20 allows the air spring to swivel the tank upwardly.

As the air spring 15 moves the tank upwardly, the valve operator arm 25 pulls the valve stem and valve closure upwardly to open the valve 24. When tank 10 reaches the limit of its upward travel, the valve 24 is in its fully open position. At this position, most of the liquid will have been drained from the holding tank 10, and with the valve 24 open, the tank can be refilled in the same manner as described above. In the refill sequence, the weight of the incoming liquid gradually overcomes the maximum load pressure on the air spring 15. This causes the spring to compress and allows the tank 10 to swivel downwardly until it reaches the limit of its downward travel, to again close the fill valve 24. In practice, during the fill sequence the tank will come to an equilibrium position when the liquid in the tank reaches its "fixed demand" level, and thereafter oscillation is not generally observed.

The liquid level control of this invention represents a distinct advance in the art for several reasons. First of all, this control device has the advantage of being completely "fail safe". For example, if the air supply to the air spring 15 should fail, the weight of the holding tank 10 and liquid 11 therein will collapse the spring and allow the tank to close the fill valve 24. This feature prevents any possibility of the fill valve sticking in the "open" position and allowing the holding tank to overfill.

Another safety feature of this invention is the access opening 12 in the holding tank 10. Since the holding tank is open to the atmosphere, there is no possibility of a pressure buildup inside the tank which could rupture the tank. The opening 12 also serves another purpose; it provides a convenient access for adding certain dry materials which can introduce "breakout air" into the treating liquid, or to add other "breaker" compositions needed on an emergency basis in case of premature shutdown.

Another advantage of this invention is that the holding tank 10 acts as a damper for the liquid stream as it flows from its source (supply tank 23) to its ultimate point of use (not shown). This is a particularly desirable feature when the stream flow between the two points is intermittent, rather than continuous, which tends to set up a fluid "hammer" effect in the conduits carrying the liquid. The liquid contained in the holding tank dissipates or absorbs the energy which produces the "hammer" condition and thus alleviates the damaging effects of this condition. Eliminating the "hammer" condition also makes it much easier to measure the flow rate of the liquid stream with conventional flow meters or other instruments designed for this purpose.

The invention claimed is:

1. Apparatus for controlling the level of a liquid in a tank, the apparatus comprises:

a holding tank for containing the liquid, which has an access opening along its top surface;

an outlet conduit which connects the bottom of the tank to a use point;

a delivery conduit having one end which extends into the tank through the access opening, and an opposite end which connects into a source for the liquid;

an air spring which is fastened to the tank, and is mounted on a support structure adjacent to the tank;

pressure regulator means which is connected into the air spring, for controlling flow of air into the air spring;

a fill valve means installed in the delivery conduit between the liquid source and the access opening;

a valve operator means which links the tank to the valve;

the outlet conduit has a swivel joint therein for swivel movement of the tank;

wherein, withdrawing liquid from the holding tank causes the air spring to expand and swivel the holding tank upwardly until it reaches a first position in which the valve operator means opens the valve, and adding liquid to the holding tank through the delivery conduit causes the air spring to compress and swivel the holding tank downwardly until it reaches a second position in which the valve operator means closes the valve.

2. Method for controlling the level of a liquid in a tank, comprising the steps of:

fastening an air spring to a tank filled with a liquid, the tank has an access opening along its top surface, the tank has an outlet conduit which connects the bottom of the tank to a use point, and the outlet conduit has a swivel joint therein for swivel movement of the tank;

installing pressure regulator means for controlling flow of air into the air spring;

installing a conduit for delivering liquid into the tank, the delivery conduit has one end which extends into the tank through the access opening and an opposite end which connects into a source for the liquid;

installing a valve means in the delivery conduit and linking the tank to the valve with a valve operator means capable of opening and closing the valve in response to an upward and downward movement of the tank;

withdrawing the liquid from the tank through the outlet conduit, to cause the air spring to expand and swivel the tank upwardly until it reaches a first position in which the valve operator means opens the valve;

adding liquid to the tank through the delivery conduit, to cause the air spring to compress and swivel the tank downwardly until it reaches a second position in which the valve operator means closes the valve.

* * * * *